United States Patent
Mirtain

[15] 3,677,319
[45] July 18, 1972

[54] BELTED PNEUMATIC TIRES

[72] Inventor: Henri Mirtain, Compiegne, France

[73] Assignee: Uniroyal Englebert France S.A., Neuilly sur Seine, France

[22] Filed: July 23, 1970

[21] Appl. No.: 57,705

[30] Foreign Application Priority Data

Aug. 19, 1969 France..................................6928426

[52] U.S. Cl.........................................................152/361
[51] Int. Cl..........................................................B60c 9/18
[58] Field of Search....................................................152/361

[56] References Cited

UNITED STATES PATENTS 3,503,432 3/1970 Maiocchi............................152/361 X Primary Examiner—Arthur L. La Point
Assistant Examiner—George H. Libman
Attorney—Norbert P. Holler

[57] ABSTRACT

Belted pneumatic tires characterized by improved tread-reinforcing breaker constructions are disclosed. In any such breaker, a single-section plural-layer non-metallic textile cord ply structure having the cords thereof oriented at a 0° angle to the median equatorial plane of the tire is combined with a plural-layer ply structure of metallic wires or strips which in each layer are crossed relative to those in the other layer and are oriented at a substantial bias angle, preferably between about 18° and 75°, to the said plane. The plural-layer textile cord ply structure, which may be located radially outwardly or inwardly of the metal ply structure or between the layers thereof, is constituted by a single length of breaker cord fabric wound in a continuous spiral circumferentially of the carcass for at least a plurality of full turns and is considerably narrower than the metal ply structure. Such tires are found to be possessed of good road-holding or cornering ability while affording good riding comfort. This abstract is not to be taken either as a complete exposition or as a limitation of the present invention, however, the full nature and extent of the invention being discernible only by reference to and from the entire disclosure.

35 Claims, 13 Drawing Figures

INVENTOR.
HENRI MIRTAIN
BY Norbert P. Holler
ATTORNEY

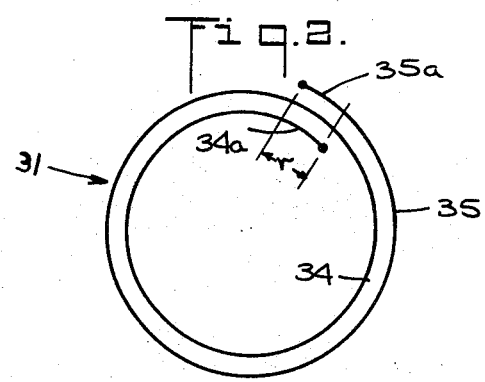
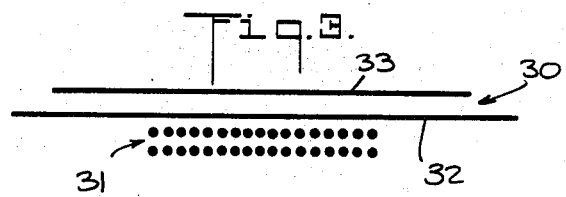
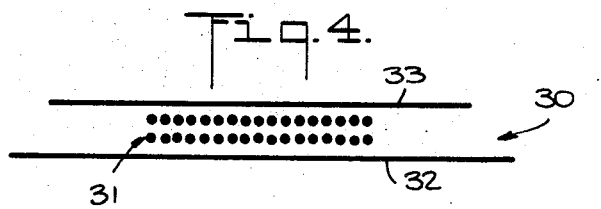
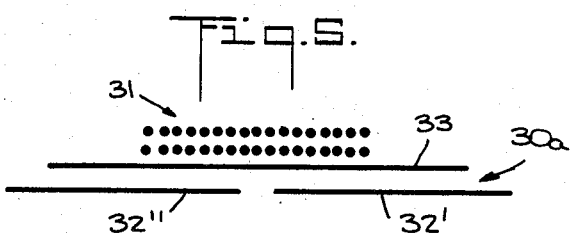
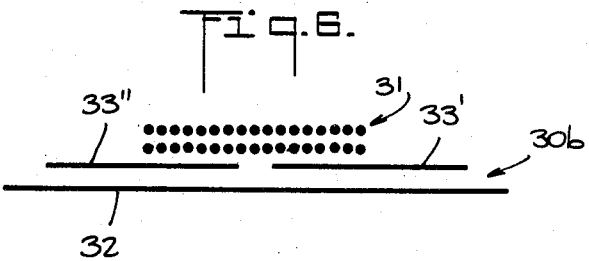

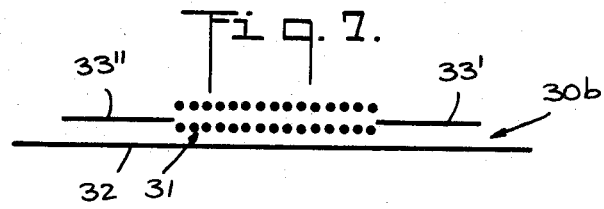
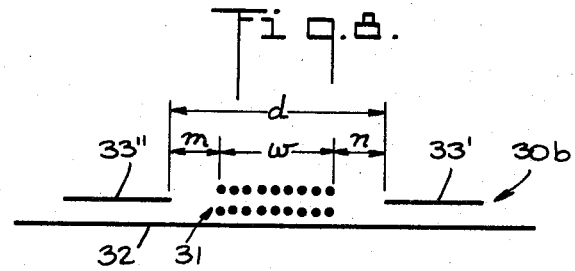
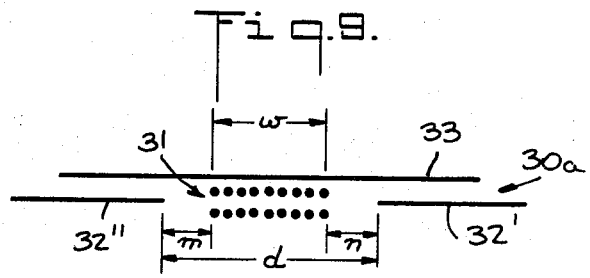
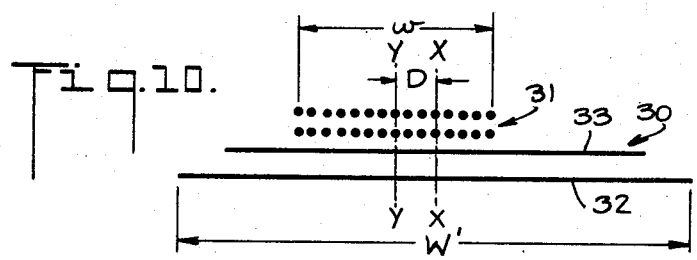
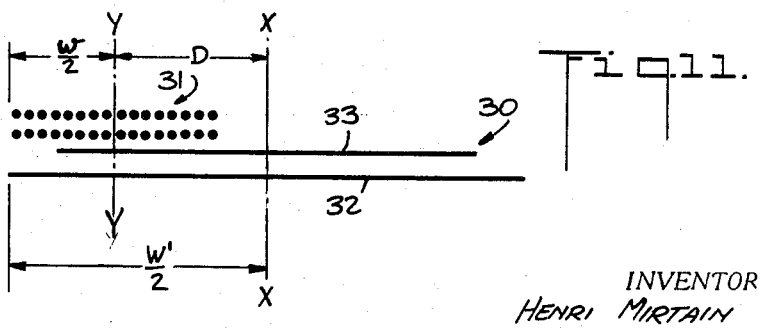

BELTED PNEUMATIC TIRES

This invention relates to belted pneumatic tires, and more particularly to such tires characterized by improved breaker constructions.

It is known that many types of conventional tires, especially radial ply carcass tires in which the tread is reinforced by a belt or breaker composed of superposed mutually crossed rubberized plies of parallel essentially inextensible cords or cables, are frequently found objectionable because, by virtue of the rigidity of such breakers in the vertical direction of deformation of the tires, they cause vibrations to be generated in the vehicles on which such tires are mounted. These vibrations are transmitted by the tires to the rims of the respective wheels and thence to the suspensions of the vehicles, and may produce a certain lack of riding comfort for the passengers. Belted tires also tend not to envelop obstacles as easily as might be desired, and it has been found that, particularly on paved roads, shocks or impacts are poorly absorbed. These drawbacks and disadvantages manifest themselves even more perceptibly in the case of tires equipped with particularly rigid metal or textile breakers such as are especially designed to increase the road holding quality of the vehicles or to improve wear resistance at high speeds.

Tests have shown that the aforementioned disadvantages can be minimized by increasing the angle at which the cords in the various breaker plies cross each other. Thus, for example, all other things being equal, a tire the breaker of which is formed by two plies of steel cables crossed symmetrically with respect to the median equatorial plane of the tire and oriented at equal but opposite angles of 28° relative to that plane, gives a much more comfortable ride than a tire formed in the same manner but in which the breaker cords are oriented at angles of only 18° with respect to the median equatorial plane. This appears to be due to the fact that the vertical forces transmitted by a 28° breaker tire when passing over obstacles are of smaller amplitudes, such a tire consequently providing a better vertical shock absorption. Nevertheless, if the angle is so increased to improve the tire from the standpoint of riding comfort with respect to an 18° breaker tire, by that very fact the road holding ability or cornering power of the tire is reduced because it presents a much smaller resistance to the forces of steering, and the tire also wears out much faster for the same reason. Furthermore, the rolling resistance of a 28° breaker tire being greater, it cannot reach as high speeds as the 18° breaker tire.

It is an object of the present invention, therefore, to provide novel and improved belted pneumatic tires characterized by breaker constructions by means of which the aforesaid drawbacks and disadvantages may be most efficaciously avoided.

A more particular object of the present invention is the provision of belted pneumatic tires with belts or breakers constructed to combine the advantages of riding comfort with those of good road holding ability, high wear resistance and high speed capability.

Generally speaking, the objectives of the invention are achieved essentially by the provision of belted tires in which the tread-reinforcing belt or breaker interposed between the carcass and the tread is characterized by the combination of a plural-layer metallic ply structure the width of which is at most equal to that of the tread, with a single-section plural-layer textile ply structure the width of which is less than that of the tread and ranges between about 25 and 75 percent of the width of the metallic ply structure, the latter comprising filiform or lamelliform metallic reinforcing elements oriented at bias angles of between about 18° and 75° to the median equatorial plane of the tire, and the textile ply structure comprising nonmetallic textile cords or like filiform reinforcing elements oriented at a 0° angle, i.e. parallel, to the median equatorial plane of the tire, the several layers of the textile ply structure being constituted by a single length of 0° breaker cord fabric of appropriate width wound in a continuous spiral circumferentially of the tire carcass for a plurality of full turns and preferably for an additional small fraction, on the order of about 10 to 30 mm, of the next full turn. The metallic ply structure may be in the form of two plies or layers of which either both are continuous from one side edge region of the tire to the other or only one is so continuous while the other is discontinuous, i.e. composed of two laterally adjacent sections, with the radially outwardmost layer being not wider, and preferably somewhat narrower, than the radially inwardmost layer (in the case of a two-section layer, the measurement being between its remote lateral edges). The layers of the textile ply structure are all of the same width, may be as wide as or either narrower or wider than the gap between the sections of a discontinuous metallic ply structure layer, and may be located either radially outwardly or inwardly of one or both layers of the metallic ply structure, symmetrically or asymmetrically with respect to the median equatorial plane of the tire.

The foregoing and other objects, characteristics and advantages of the present invention will be more clearly understood from the following detailed description of several embodiments thereof when read in conjunction with the accompanying drawings, in which:

FIG. 2 is a diagrammatic axial view of the plural layer 0° textile ply structure utilized in the breakers according to the present invention;

FIGS. 3 to 11 are diagrammatic illustrations, similar in format to that of FIG. 1 but without the tire environment, of various modifications and embodiments of the breaker construction of the present invention.

Figure 1:
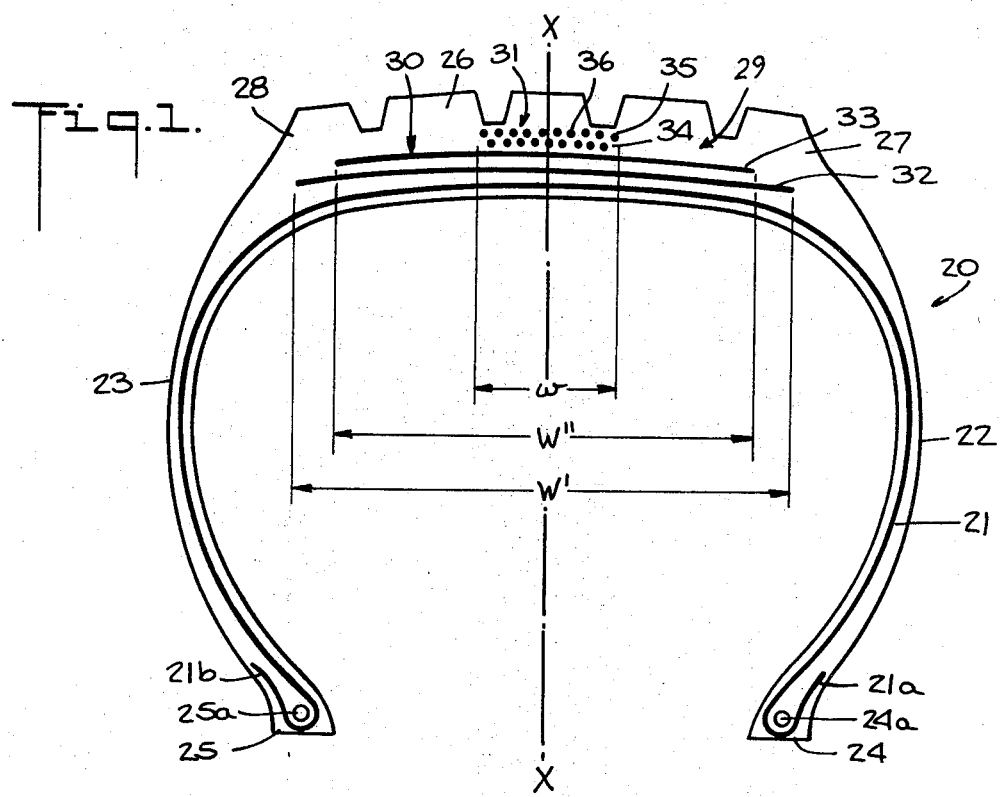
FIG. 1 is a diagrammatic transverse or radial section through a tire characterized by a breaker construction including plural-layer textile and metallic ply structures according to one embodiment of the present invention.

Referring now to the drawings in greater detail, the tire 20 (FIG. 1) according to the basic aspects of the present invention comprises, for example, a radial or substantially radial ply carcass 21, which may be either a single-ply or a plural-ply structure and the reinforcing elements of which may be cords or cables of such materials as rayon, nylon, polyester, glass fiber, steel wire or the like. The tire 20 further includes sidewalls 22 and 23 overlying the respective lateral regions of the carcass and terminating at their radially inwardmost edges in a pair of beads 24 and 25, a tread 26 overlying the crown region of the carcass and adjoining the sidewalls 22 and 23 at their radially outwardmost regions, i.e. the shoulders 27 and 28 of the tire, and a breaker 29 (construction of which is the basic subject matter of the present invention, as will be more fully explained presently) interposed between the crown region of the carcass and the tread for reinforcing the latter. As usual, the marginal regions of the carcass ply or plies 21 are turned up about the bead cores 24a and 25a, as shown at 21a and 21b.

Figure 1A:
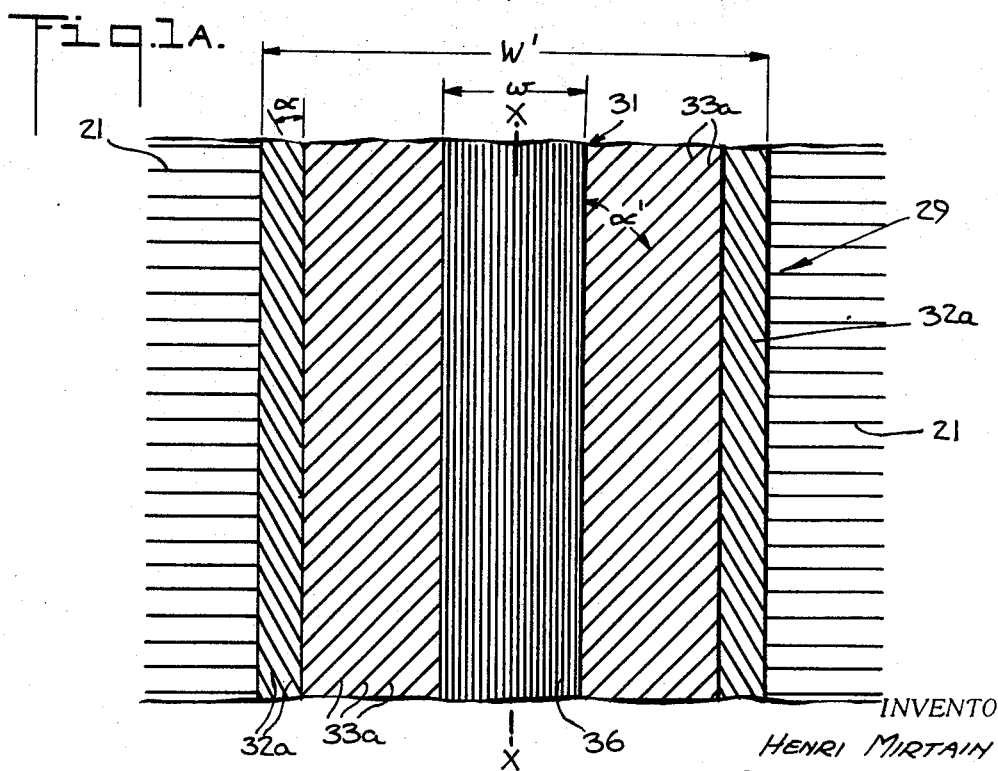
FIG. 1A is a diagrammatic plan view of the breaker construction of the tire shown in FIG. 1.

It is to be understood that although the tire 20 has been referred to herein and is illustrated in FIG. 1 (see also FIG. 1A) as a radial ply tire (such a tire, as is well known in the art, having a carcass construction in which the cords in each body ply are substantially radial in orientation, i.e. disposed in planes oriented substantially normal to the planes of the beads and to the crown centerline or median equatorial plane X—X of the tire and thus relatively high bias angles of about 80° to 90° ), the present invention, concerning, as it does, only the breaker construction per se, is applicable as well to belted tires having non-radial or bias ply carcass constructions in which the cords are oriented at bias angles below 80°.

Referring now again to FIGS. 1 and 1A, the breaker 29 according to one embodiment of the basic principles of the present invention includes two distinct ply structures 30 and 31 arranged in superposed relation to each other circumferentially of the carcass 21 and symmetrically with respect to the median equatorial plane X—X of the tire 20. The ply structure 30 is shown as a plural-layer arrangement of two plies or layers 32 and 33 of rubberized parallel metallic, preferably steel, reinforcing elements 32a and 33a which may be either lamelliform, i.e. in the form of flat strips or bands with rounded edges, or filiform, i.e. in the form of generally round wires or cables, the elements 32a and 33a being symmetrically oriented at respective equal but opposite substantial bias angles $\alpha$ and $\alpha'$ to the median equatorial plane. The ply structure 31 is shown as a plural-layer arrangement of two plies or layers 34 and 35 of rubberized parallel breaker cords or cables 36 of non-metallic textile material such as rayon, glass fiber, nylon, polyester, and the like, oriented at an essentially 0° angle, i.e. parallel, to the said plane. The width W' of the radially inwardmost layer 32 of the metallic ply structure 30 is at most equal to, and preferably is less than, the width of the tread or road-contacting surface 26 of the tire 20, while the width W'' of the radially outwardmost layer 33 of the ply structure 30 is at most equal to, and preferably is less than, the width W' of the other layer 32. At the same time, the maximum width w of the textile ply structure 31 is considerably less than the maximum width W' of the metallic ply structure 30, ranging between about 0.25W' and about 0.75W' but preferably between about 0.3W' and 0.4W', e.g. one third of W', and both layers 34 and 35 of this ply structure are of the same width.

The metallic reinforcing elements in the ply structure 30, as previously mentioned, in all cases are oriented at substantial bias angles to the median equatorial plane of the tire. The orientation may range from about 18° to about 75° with respect to the median equatorial plane X—X but preferably will be between about 20° and about 45° to that plane, for example at about 28°. Where the breaker utilizes lamelliform metallic reinforcing elements, these will generally be in the form of thin flat metal, preferably steel, strips or bands having a thickness between about 0.12 and 0.40 mm, preferably on the order of about 0.25 mm, and a width between about 1 and 3 mm, and the lateral spacing of adjacent strips or bands in any given layer of the ply structure will be between about 0.5 and 1 mm. On the other hand, where the breaker utilizes filiform metallic reinforcing elements, these will generally be in the form of round metal, preferably steel, wires or cables having an effective diameter between about 0.25 and 2.5 mm, and the lateral spacing of adjacent wires or cables in the ply structure will be between about 0.5 and 1.0 times the said diameter. It is within the contemplation of the present invention that either type of metallic reinforcing elements may be used in both plies of the ply structure 30, or that one ply may include lamelliform elements and the other filiform elements.

The textile ply structure 29 is constituted by a single length of weftless 0° breaker cord fabric, in which all the cords extend substantially parallel to the longitudinal dimension of the fabric, wound in a continuous spiral circumferentially about the crown region of the carcass 21 for at least a plural number of full turns (FIG. 2) equal to the number of layers desired, two in the breaker construction according to the present invention shown in the drawings. Preferably, the length of cord fabric is wound in a continuous spiral circumferentially of the tire carcass for somewhat more than the requisite number of full turns, i.e. to include a small fraction of an additional turn, so as to dispose the outer terminal end section 35a of the fabric in overlapping relation to the inner terminal end section 34a of an amount r equal to between about 10 and 30 mm and preferably about 20 mm.

The breaker construction according to the present invention may, of course, take any one of a number of different forms, representative ones of such forms being diagrammatically illustrated in FIGS. 3 to 12. Thus, as shown in FIG. 3, the textile ply structure 31 may be located radially inwardly of the entire metallic ply structure 30, and as shown in FIG. 4, the textile ply structure may be interposed between the layers 32 and 33 of the metallic ply structure.

It is also contemplated, within the purview of the invention, that the metallic ply structure may comprise one layer which is transversely discontinuous, as shown in FIG. 5 for the ply structure 30a having the radially inwardmost layer constituted by two laterally adjacent ply sections 32' and 32'', and in FIG. 6 for the ply structure 30b having the radially outwardmost layer constituted by two laterally adjacent ply sections 33' and 33''. In both of the last-described embodiments, it will be noted, the discontinuity (which is shown as being symmetrical with respect to the median equatorial plane of the tire, although it may be asymmetrically located by making the ply sections of appropriately different widths) is narrower than the associated textile ply structure 31 which is located radially outwardly of the metallic ply structure, and it will be clear that the textile ply structure may be otherwise located (not shown) relative to the metallic ply structure in the manner suggested by FIGS. 3 and 4. If, on the other hand, the width of the gap or discontinuity in the sectional layer of the metallic ply structure is substantially equal to that of the textile ply structure, the latter may be fitted into and arranged to occupy fully the space between the adjacent ply sections of the associated discontinuous metallic ply. This is shown in FIG. 7 for a metallic ply structure 30b having outer ply sections 33' and 33'', but it will be understood that the same type of arrangement (not shown) can be utilized in a metallic ply structure 30a having inner ply sections 32' and 32''. If, still furthere, the width d (FIGS. 8 and 9) of the gap in the discontinuous layer of the metallic ply structure is greater than the width w of the textile ply structure, the latter will again be fitted into the space between the associated ply sections, as indicated in FIGS. 8 and 9 for the metallic ply structures 30b and 30a, respectively, but will not completely fill this space, leaving unoccupied lateral gaps of width m and n which may be equal in the case of a symmetrical construction and unequal in the case of an asymmetrical construction (in the general case, actually, the magnitude of either m or n may lie anywhere between 0 and d–w).

Figure 12:
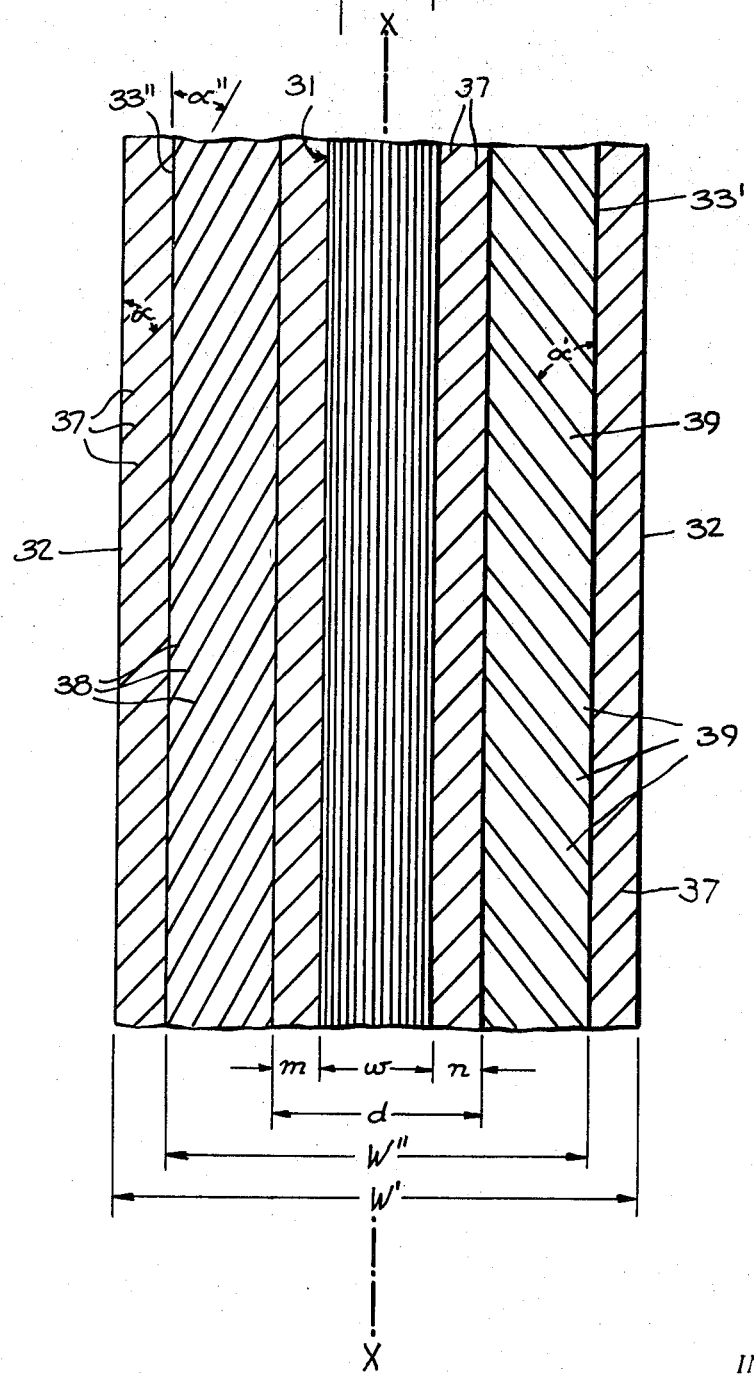
FIG. 12 is a diagrammatic plan view, similar in format to that of FIG. 1A, of yet another embodiment of the breaker construction of the present invention.

In any of the breaker constructions characterized by the provision of a discontinuous or sectioned ply or layer in the metallic ply structure, of course, although the reinforcing elements in the two laterally adjacent ply sections must be disposed in crossing relation to the reinforcing elements in the continuous layer, the bias angles may or may not be the same. Thus, in the breaker shown merely by way of example in FIG. 12 (the basic arrangement illustrated is that of the embodiment of FIG. 8), the reinforcing elements of the continuous metallic layer 32 are oriented at an angle $\alpha$ to the median equatorial plane X—X, the reinforcing elements of the ply section 33' at an opposite angle $\alpha$, and the reinforcing elements of the ply section 33'' at an angle $\alpha''$ different from but in the same sense as the angle $\alpha$. It will be understood, however, that the reinforcing elements of both ply sections 33' and 33'' may be oriented in the same sense and that the angles $\alpha'$ and $\alpha''$ may be equal or unequal regardless of the relative senses thereof. FIG. 12 also illustrates that the breaker construction may have a constitutive asymmetry built in as distinguished from the geometrical asymmetry just described, for example by utilizing round wires 37 and 38 as the reinforcing elements in the continuous ply 32 and the ply section 33'', and flat strips or bands 39 as the reinforcing elements in the ply section 33'. If desired also, the rubber coating the respective sets of reinforcing elements in the ply sections of the discontinuous layer may be of different hardnesses, e.g. a relatively low hardness of about 60 Shore A in one ply section and a relatively high hardness of about 75 Shore A in the other. Any number of variations and different selections or combinations of these parameters, as well as their incorporation in others of the illustrated breaker constructions, will readily suggest themselves to those skilled in the art.

It will also be understood that comparable to the situation in which the dimensions m and n of a breaker construction such as that of FIGS. 8, 9 and 12 are unequal, the textile ply structure 31 may also be asymmetrically positioned in a breaker construction utilizing a continuous layer metallic ply structure 30, as shown in FIGS. 10 and 11. The degree of asymmetry in such a case may be expressed as the displacement D of the mid-circumferential plane Y—Y of the textile ply structure from the median equatorial plane X—X of the tire (in the general case, therefore, D may lie anywhere between 0 for a symmetrical construction such as that of FIG. 1 and $(W'-w)/2$ for the maximum asymmetrical construction such as that of FIG. 11 which is characterized by one of the lateral edges of the textile ply structure directly overlying one of the lateral edges of the metallic ply structure).

The breaker constructions according to the present invention, in each case including a relatively wide plural-layer metallic ply structure and a relatively considerably narrower, single-section, plural-layer textile ply structure, by virtue of the great number of possible variations of their structural, constitutive and geometric parameters, thus enable tires of absolute symmetry, as well as tires with many degrees of asymmetry, and whose characteristics can be adapted to the most varied practical needs, to be produced.

It will be understood that the foregoing description of preferred embodiments of the present invention is for purposes of illustration only, and that the various structural features and relationships herein disclosed are susceptible to a number of modifications and changes none of which entails any departure from the spirit and scope of the present invention as defined in the hereto appended claims.

Having thus described the invention, what is claimed and desired to be protected by Letters Patent is:

1. In a pneumatic tire having a carcass, a non-separable tread surrounding the crown region of said carcass, sidewalls overlying the lateral regions of said carcass from the bead regions of the tire to the marginal regions of said tread, and a tread-reinforcing breaker disposed circumferentially about the crown region of said carcass between the latter and said tread; said breaker consisting of a first plural-layer ply structure including elongated reinforcing elements made of metallic material, and a considerably narrower single-section second plural-layer ply structure including elongated reinforcing elements made of non-metallic textile material, said ply structures being arranged one in concentric superposed relation to the other, said metallic reinforcing elements in each layer of said first ply structure being oriented at a respective bias angle of between about 18° and 75° to the median equatorial plane of the tire and in crossing relation to the metallic reinforcing elements in each adjacent layer of said first ply structure, the width of the radially inwardmost layer of said first ply structure being at most equal to that of said tread, the width of any other layer of said first ply structure being at most equal to that of said radially inwardmost layer, said second ply structure in all layers thereof being continuous transversely of the tire from one lateral edge of said second ply structure to the other lateral edge thereof, said layers of said second ply structure being all of identical width and constituted by a single length of 0° textile breaker cord fabric extending circumferentially about the crown region of said carcass in a continuous spiral for at least a plurality of full turns, said non-metallic textile reinforcing elements in said second ply structure being oriented at an essentially 0° angle to the median equatorial plane of the tire, and the width of said second ply structure as measured from one of said lateral edges thereof to the other being between about one-fourth and three-fourths of the width of said radially inwardmost layer of said first ply structure.

2. A pneumatic tire according to claim 1, wherein the width of said second ply structure is about one-third of the width of said first ply structure.

3. A pneumatic tire according to claim 2, wherein said metallic reinforcing elements in each layer of said first ply structure are oriented at an angle of between about 20° and 45° to the median equatorial plane of the tire.

4. A pneumatic tire according to claim 3, wherein said second ply structure is disposed in circumferentially surrounding relation to at least a part of said first ply structure.

5. A pneumatic tire according to claim 4, wherein said first ply structure is constituted of two layers each of which is continuous transversely of the tire from one edge region of said tread to the other, and the radially inwardmost layer of said second ply structure is directly adjacent to the radially outwardmost layer of said first ply structure.

6. A pneumatic tire according to claim 5, wherein said second ply structure is disposed symmetrically with respect to the median equatorial plane of the tire.

7. A pneumatic tire according to claim 5, wherein said second ply structure is disposed asymmetrically with respect to the median equatorial plane of the tire.

8. A pneumatic tire according to claim 7, wherein said second ply structure is disposed with one of its lateral edges in substantially coinciding overlying relation to the proximate one of the lateral edges of said radially inwardmost layer of said first ply structure.

9. A pneumatic tire according to claim 3, wherein at least a part of said first ply structure is disposed in circumferentially surrounding relation to said second ply structure.

10. A pneumatic tire according to claim 9, wherein said first ply structure is constituted of two layers each of which is continuous transversely of the tire from one edge region of said tread to the other, and said radially inwardmost layer of said first ply structure is directly adjacent the radially outwardmost layer of said second ply structure.

11. A pneumatic tire according to claim 9, wherein said first ply structure is constituted of two layers each of which is continuous transversely of the tire from one edge region of said tread to the other, and said second ply structure is disposed between said layers of said first ply structure.

12. A pneumatic tire according to claim 4, wherein said first ply structure is constituted of two layers one of which is continuous and the other discontinuous transversely of the tire from one edge region of said tread to the other, and the radially inwardmost layer of said second ply structure is directly adjacent to the radially outwardmost layer of said first ply structure.

13. A pneumatic tire according to claim 12, wherein said radially inwardmost layer of said first ply structure is discontinuous, the gap between the laterally adjacent sections of said discontinuous layer being narrower than said second ply structure, and the latter being positioned in straddling relation to said gap.

14. A pneumatic tire according to claim 12, wherein said radially outwardmost layer of said first ply structure is discontinuous, the gap between the laterally adjacent sections of said discontinuous layer being narrower than said second ply structure, and the latter being positioned in straddling relation to said gap.

15. A pneumatic tire according to claim 4, wherein said radially outwardmost layer of said first ply structure is discontinuous, the gap between the laterally adjacent sections of said discontinuous layer being substantially equal in width to said second ply structure, the latter being positioned within the confines of said gap and substantially fully occupying the same, and the radially inwardmost layer of said second ply structure being disposed directly adjacent said radially inwardmost layer of said first ply structure.

16. A pneumatic tire according to claim 4, wherein said radially outwardmost layer of said first ply structure is discontinuous, the gap between the laterally adjacent sections of said discontinuous layer being greater in width than said second ply structure, the latter being positioned within the confines of said gap and partly occupying the same, and the radially inwardmost layer of said second ply structure being disposed directly adjacent said radially inwardmost layer of said first ply structure.

17. A pneumatic tire according to claim 16, wherein said second ply structure is disposed symmetrically with respect to said gap.

18. A pneumatic tire according to claim 16, wherein said second ply structure is disposed asymmetrically with respect to said gap.

19. A pneumatic tire according to claim 9, wherein said first ply structure is constituted of two layers one of which is continuous and the other discontinuous transversely of the tire from one edge region of said tread to the other, and said second ply structure is disposed in at least partly bridging relation to the gap between the laterally adjacent sections of said discontinuous layer.

20. A pneumatic tire according to claim 19, wherein said radially inwardmost layer of said first ply structure is discontinuous, the gap between the laterally adjacent sections of said discontinuous layer being narrower than said second ply structure.

21. A pneumatic tire according to claim 19, wherein said radially inwardmost layer of said first ply structure is discontinuous, the gap between the laterally adjacent sections of said discontinuous layer being substantially equal in width to said second ply structure, the latter being positioned within the confines of said gap and substantially fully occupying the same, and the radially outwardmost layer of said second ply structure being disposed directly adjacent said radially outwardmost layer of said first ply structure.

22. A pneumatic tire according to claim 19, wherein said radially inwardmost layer of said first ply structure is discontinuous, the gap between the laterally adjacent sections of said discontinuous layer being greater in width than said second ply structure, the latter being positioned within the confines of said gap and partly occupying the same, and the radially outwardmost layer of said second ply structure being disposed directly adjacent said radially outwardmost layer of said first ply structure.

23. A pneumatic tire according to claim 22, wherein said second ply structure is disposed symmetrically with respect to said gap.

24. A pneumatic tire according to claim 22, wherein said second ply structure is disposed asymmetrically with respect to said gap.

25. A pneumatic tire according to claim 3, wherein said first ply structure is constituted of two layers in one of which the respective metallic reinforcing elements are lamelliform and in the other of which the respective metallic reinforcing elements are filiform.

26. A pneumatic tire according to claim 3, wherein said first ply structure is constituted of two layers one of which is continuous and the other discontinuous transversely of the tire from one edge region of said tread to the other, the respective metallic reinforcing elements in said continuous layer being filiform, and the respective metallic reinforcing elements in at least one section of said discontinuous layer being lamelliform.

27. A pneumatic tire according to claim 26, wherein said metallic reinforcinG elements in one of said sections of said discontinuous layer are oriented at a different bias angle than said metallic reinforcing elements in the other section.

28. A pneumatic tire according to claim 3, wherein said first ply structure is constituted of two layers one of which is continuous and the other discontinuous transversely of the tire from one edge region of said tread to the other, said metallic reinforcing elements in one of said sections of said discontinuous layer being oriented at a different bias angle than said metallic reinforcing elements in the other section.

29. A pneumatic tire according to claim 28, wherein the two different bias angles are equal numerically but opposite in sense relative to the median equatorial plane of the tire.

30. A pneumatic tire according to claim 28, wherein the two different bias angles are unequal numerically but in the same sense relative to the median equatorial plane of the tire.

31. A pneumatic tire according to claim 28, wherein the two different bias angles are unequal numerically and opposite in sense relative to the median equatorial plane of the tire.

32. A pneumatic tire according to claim 1, wherein said non-metallic textile reinforcing elements in said second ply structure are made of synthetic filaments of a material selected from the group consisting of glass fiber, nylon, rayon, polyester and the like.

33. A pneumatic tire according to claim 32, wherein said second ply structure extends about said crown region of said carcass for a small amount more than two full turns sufficient to create an overlap of between about 10 and 30 mm of the outermost terminal section of said breaker cord fabric relative to the innermost terminal section thereof.

34. A pneumatic tire according to claim 1, wherein said metallic reinforcing elements in at least a part of one layer of said first ply structure are thin flat strips or bands of steel each between about 0.12 and 0.40 mm thick and between about 1 and 3 mm wide, with adjacent ones of said strips or bands being spaced between about 0.5 and 1 mm apart.

35. A pneumatic tire according to claim 1, wherein said metallic reinforcing elements in at least a part of one layer of said first ply structure are round steel wires or cables each having an effective diameter between about 0.25 and 2.5 mm, with adjacent ones of said wires or cables being spaced between about one-half and one full wire or cable diameter apart.

* * * * *